Sept. 21, 1926. 1,600,456

C. W. DIEKMANN

STEERING WHEEL

Filed June 30, 1925

Inventor;
Carl W. Diekmann
By Frank C. Goe
Atty.

Patented Sept. 21, 1926.

1,600,456

UNITED STATES PATENT OFFICE.

CARL W. DIEKMANN, OF EVANSVILLE, INDIANA.

STEERING WHEEL.

Application filed June 30, 1925. Serial No. 40,534.

This invention relates to steering wheels for automobiles, trucks, and other vehicles.

The present practice is to manufacture steering wheels with special hubs of a size adapting them to the automobiles, trucks, and the like, on which they are intended to be used. This has been necessary because the steering columns of different automobiles, trucks, etc., are of different sizes and the hub of the steering wheel has to fit the particular steering column with which it is intended to be used.

The object of my invention is to provide an improved steering wheel and hub or bushing by which the same wheel or spider construction may be quickly and easily fitted to any steering column, thus obviating the necessity for manufacturing a special steering wheel for each make of automobile or truck.

The foregoing object is accomplished by the provision of a steering wheel having its hub of special construction so that it will be adapted to fit specially constructed bushings, in an interchangeable manner, thus enabling a bushing to be used which has a hole and keyway suitable for use on the steering column of the particular car with which the steering wheel is to be used.

A practical embodiment of the invention is set forth hereinafter and is shown in the accompanying drawings, in which—

Figure 1:
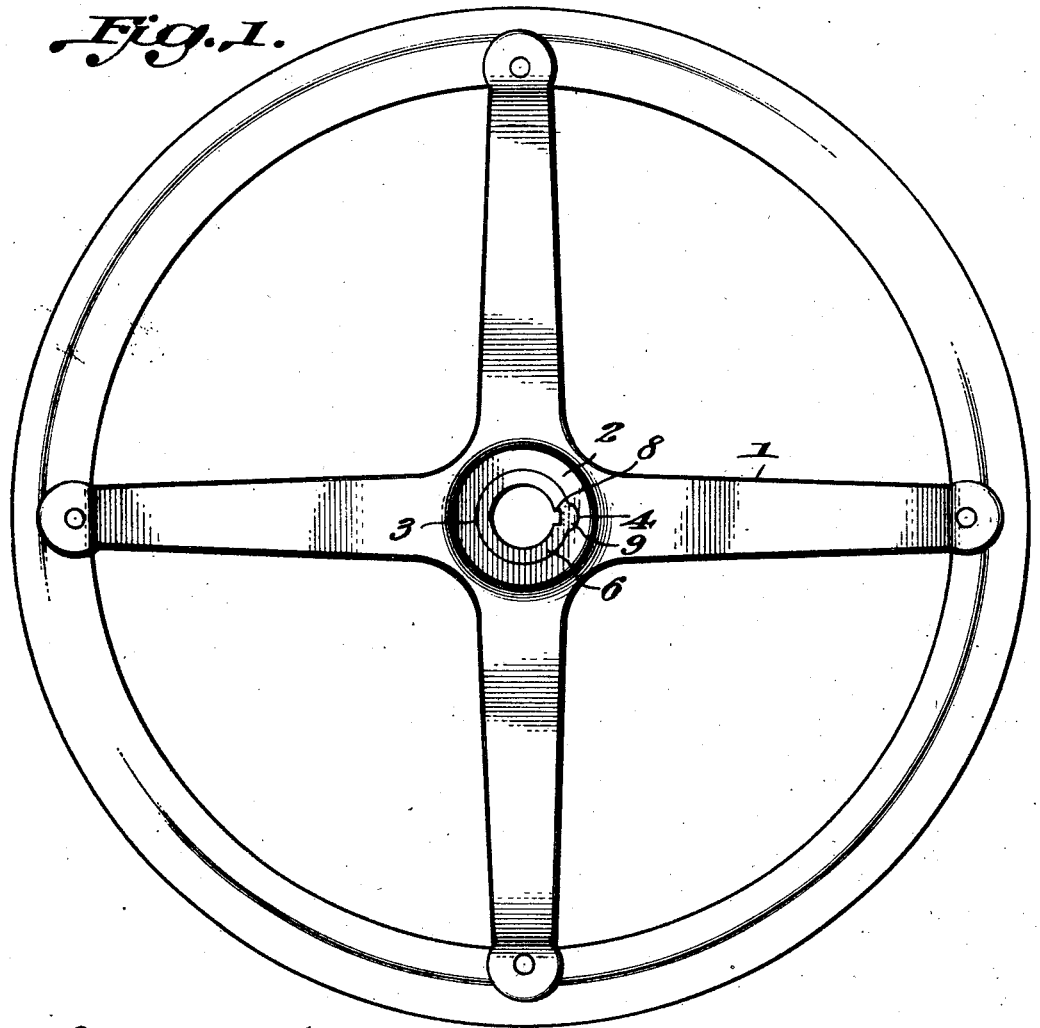
Figure 1 is a plan view, the steering column being omitted.
Figure 2:
Fig. 2 is a detail sectional view through the hub and rim of the steering wheel, showing my improvements.
Figure 3:
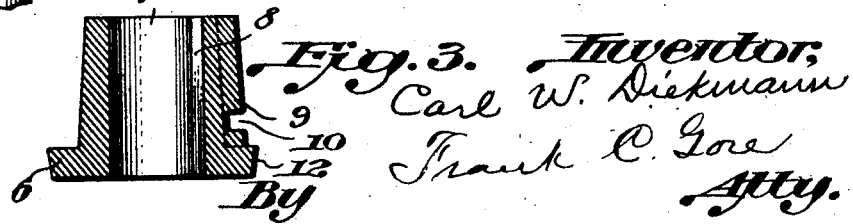
Fig. 3, is a detail section through the bushing alone.

The spider of an ordinary steering wheel which has been equipped with my improvement is shown at 1, the improvements relating to the hub 2, as the other parts of the wheel may be of any desired construction.

The hub 2 has either a straight, or, a tapered bore 3, as may be preferred, and is provided with a notch, channel, or keyway 4 extending from the bottom to the top thereof. The steering column 5 usually fits into the bore of the steering wheel which makes it necessary for the steering wheel to have its hub specially constructed to fit the particular steering column on which the wheel is to be used, in constructions at present in use.

I obviate this necessity by providing a bushing 6 which has a bore 7 provided with a key seat 8 by which the bushing may be keyed to the steering column 5. The bushing has an integral key 9 which fits the key seat or channel 4 for the purpose of locking the steering wheel 1 to the bushing. To prevent accidental detachment, the hub 2 is keyed or pinned or fastened to the bushing. For that purpose a slot 10 is cut crosswise of the integral key 9 and the hub 2 carries a pin or screw 11 whose tip enters the slot, thus providing a positive lock, not dependent on friction alone, which prevents the hub from becoming detached.

The bushing also has a flange 12 on which the hub 2 rests.

It is quite possible that several cars may have a steering column of the same diameter and that the same bushing 6 would be adapted to several automobiles. However, the invention provides for interchangeable bushings to fit the main steering wheel so that it is only necessary to provide a bushing of the correct size for a given car in order to utilize a steering wheel having my improved hub construction.

What I claim is:—

The combination with the steering column of an automobile, of a bushing secured thereto which has a key extending lengthwise thereof, said key being provided with a slot extending crosswise thereof, and a steering wheel having a hub whose bore receives the bushing and is provided with a channel or key-way receiving the aforesaid key, and a locking member carried by the hub, the tip of said member entering the slot and positively locking the hub to the bushing.

In testimony whereof I affix my signature.

CARL W. DIEKMANN.